United States Patent
Sun et al.

(10) Patent No.: US 8,852,542 B2
(45) Date of Patent: Oct. 7, 2014

(54) SELECTIVE CATALYTIC $NO_x$ REDUCTION PROCESS AND APPARATUS PROVIDING IMPROVED GASSIFICATION OF UREA TO FORM AMMONIA-CONTAINING GAS

(75) Inventors: William H. Sun, Lisle, IL (US); John M. Boyle, Oak Park, IL (US); Ronald A. Lau, North Aurora, IL (US)

(73) Assignee: Fuel Tech, Inc., Warrenville, IL (US)

( * ) Notice: Subject to any disclaimer, the term of this patent is extended or adjusted under 35 U.S.C. 154(b) by 402 days.

(21) Appl. No.: 12/472,508

(22) Filed: May 27, 2009

(65) Prior Publication Data

US 2009/0297417 A1    Dec. 3, 2009

Related U.S. Application Data

(60) Provisional application No. 61/056,121, filed on May 27, 2008.

(51) Int. Cl.

| | |
|---|---|
| *B01D 53/56* | (2006.01) |
| *B01D 47/00* | (2006.01) |
| *C01B 21/00* | (2006.01) |
| *A61H 33/12* | (2006.01) |
| *A61L 9/00* | (2006.01) |
| *B01B 1/00* | (2006.01) |
| *C01C 1/08* | (2006.01) |
| *B01D 53/90* | (2006.01) |
| *F01N 3/20* | (2006.01) |

(52) U.S. Cl.
CPC ............. *B01B 1/005* (2013.01); *F01N 2240/20* (2013.01); *F01N 2610/02* (2013.01); *C01C 1/086* (2013.01); *F01N 3/2066* (2013.01); *F01N 2240/40* (2013.01); *B01D 2257/404* (2013.01); *B01D 2251/2067* (2013.01); *B01D 53/90* (2013.01)

USPC .......... 423/235; 423/210; 423/351; 422/305; 392/403

(58) Field of Classification Search
None
See application file for complete search history.

(56) References Cited

U.S. PATENT DOCUMENTS

| | | | |
|---|---|---|---|
| 3,095,416 A | 6/1963 | Crowley et al. | |
| 4,626,417 A | 12/1986 | Young | |
| 6,048,510 A * | 4/2000 | Zauderer | 423/235 |
| 6,114,227 A | 9/2000 | Leksell et al. | |
| 6,928,807 B2 | 8/2005 | Jacob et al. | |
| 7,090,810 B2 | 8/2006 | Sun et al. | |
| 7,220,395 B2 | 5/2007 | Cooper et al. | |
| 7,562,521 B2 * | 7/2009 | Shirai et al. | 60/286 |

(Continued)

FOREIGN PATENT DOCUMENTS

GB        1435925    *  7/1973

*Primary Examiner* — Melvin C Mayes
*Assistant Examiner* — Sheng H Davis
(74) *Attorney, Agent, or Firm* — Thaddius J. Carvis

(57) ABSTRACT

Disclosed are methods and apparatus enabling the efficient utilization of urea for purposes such as selective catalytic reduction (SCR) of $NO_x$, which enable feeding urea to a chamber designed to efficiently and completely gasify the urea to enable ammonia feed. Preferably, aqueous urea is fed to a gasification chamber, which is also fed with heated gases. An injector means, capable of distributing the aqueous urea as fine droplets, is positioned centrally of a gas distribution plate in the chamber. An arrangement of spaced holes in the gas distribution plate provides higher gas velocity in the vicinity of the injector means than near the walls of the chamber. Uniform gas distribution without equipment fouling is achieved.

9 Claims, 2 Drawing Sheets

(56) References Cited

U.S. PATENT DOCUMENTS

| | | |
|---|---|---|
| 2003/0110763 A1* | 6/2003 | Pawson et al. .................. 60/286 |
| 2005/0013756 A1* | 1/2005 | Amou et al. ............... 423/239.1 |
| 2005/0268617 A1* | 12/2005 | Amond et al. .................. 60/776 |
| 2007/0003458 A1 | 1/2007 | Gschwind |
| 2007/0036694 A1* | 2/2007 | Nishioka et al. ............... 422/168 |
| 2007/0101703 A1* | 5/2007 | Kanaya et al. .................. 60/286 |
| 2008/0087739 A1* | 4/2008 | Tarabulski et al. ............... 239/11 |
| 2008/0116054 A1* | 5/2008 | Leach et al. ................ 204/157.3 |
| 2009/0025368 A1* | 1/2009 | Sakimoto et al. ............... 60/285 |
| 2009/0044524 A1* | 2/2009 | Fujino ............................. 60/303 |
| 2009/0266064 A1* | 10/2009 | Zheng et al. ..................... 60/317 |

* cited by examiner

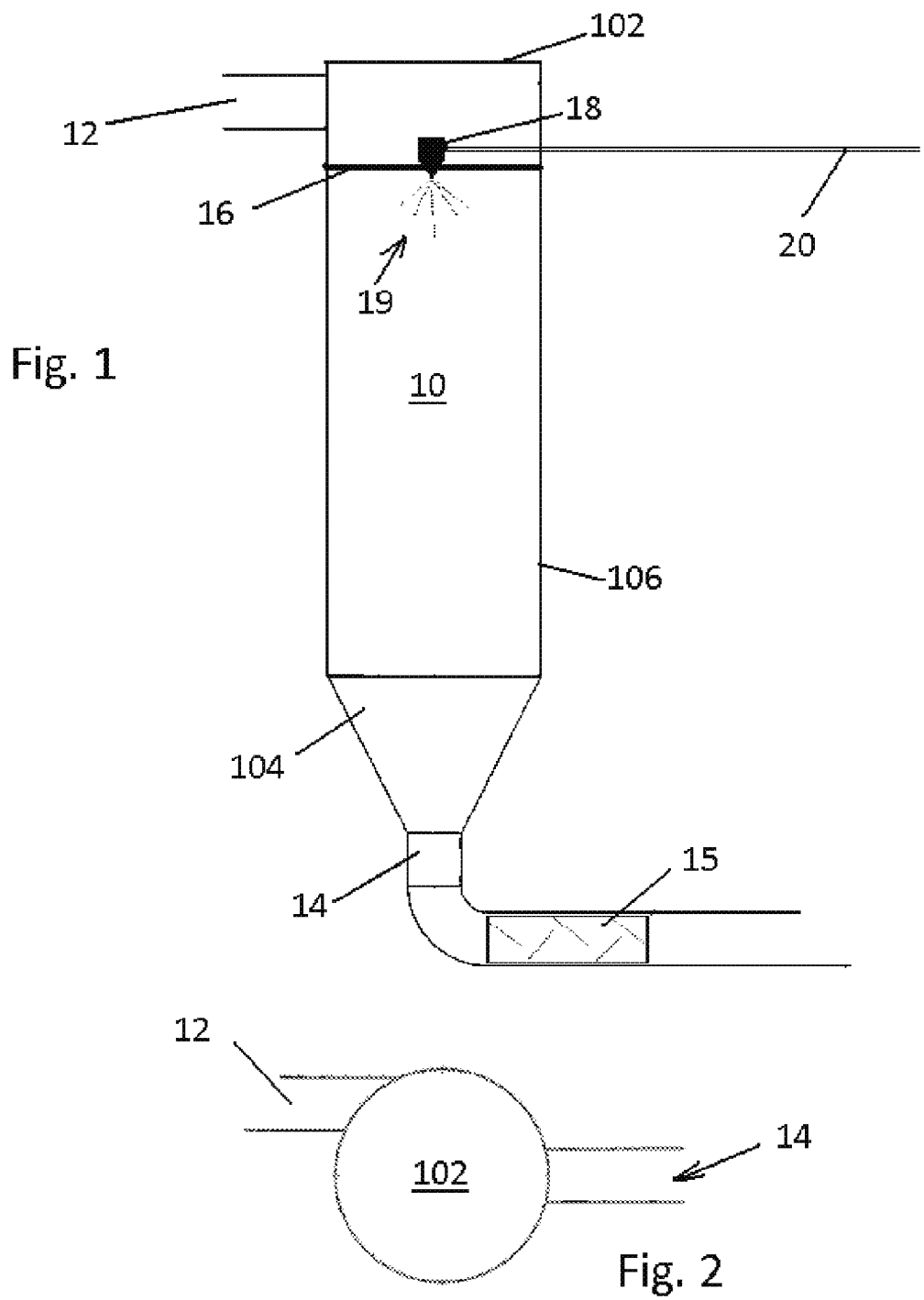

SELECTIVE CATALYTIC NO$_x$ REDUCTION PROCESS AND APPARATUS PROVIDING IMPROVED GASSIFICATION OF UREA TO FORM AMMONIA-CONTAINING GAS

CROSS REFERENCE TO RELATED APPLICATIONS

This application claims priority to and is a continuation in part of U.S. Provisional Patent Application No. 61/056,121, filed May 27, 2008, the entire disclosure of which is incorporated by reference.

FIELD OF THE INVENTION

The invention relates generally to the efficient utilization of urea for purposes such as selective catalytic reduction (SCR) of NO$_x$, and more particularly to feeding urea to a chamber designed to efficiently and completely gasify (by pyrolysis and/or hydrolyzation) the urea to feed an SCR unit.

BACKGROUND OF THE INVENTION

There are a number of processes for which ammonia is useful in a heated gas stream. In the case of air pollution control, examples are flue gas conditioning wherein a small amount of ammonia is injected and SCR system which depend on ammonia in relatively large amounts. Wherever ammonia is required in a hot gas stream, it would be desirable to avoid the danger and expense of dealing with ammonia per se.

SCR has been proven to be highly effective at NO$_x$ reduction, and SCR units can generally be scaled to the size required. However, SCR units typically require the use of ammonia as a reducing reagent, and it is a common problem that ammonia is difficult and dangerous to store, especially in populated areas. Thus, the use of urea and ammonia generators such as described in U.S. Pat. No. 7,090,810 to Sun, et al., and U.S. Pat. No. 6,077,491 to Cooper, et al., are often effective, but the ability to fully gasify the urea on an as-needed basis can cause problems if not done correctly.

When urea for such a gasification chamber or other like chemical for other commercial units is introduced, effective operation without fouling of equipment requires uniform distribution and rapid pyrolysis and/or hydrolysis. A proper velocity distribution of hot air before and after introduction of urea is critical for the operation of such a gasification chamber. While the concept of a perforated plate has been suggested to provide uniform flow prior to urea injection to provide a desirable gas pattern for urea distribution, in practice these devices can cause improper reagent back flow or recirculation which can result in solid urea encrusting on the plate, chamber walls or near the nozzle, causing fouling and related problems. It would be desirable to avoid fouling, especially on the nozzle.

There is a present need for a process, apparatus and system for efficient utilization of urea for purposes such as selective catalytic reduction (SCR) of NO$_x$, and more particularly for gasification apparatus, methods and systems that enable feeding urea to a chamber designed to efficiently and completely gasify (by pyrolysis and/or hydrolyzation) the urea to feed a SCR unit.

There is a particular need for such a system which converts urea to ammonia, yet maintains the ability to fully control ammonia generation without equipment fouling or excessive reagent usage or loss of pollution control effectiveness.

SUMMARY OF THE INVENTION

The present invention provides processes for introducing ammonia into a heated gas stream without actually storing or handling ammonia in bulk form.

The present invention provides a process, apparatus and system for gasifying urea for reducing the concentration of nitrogen oxides in combustion gases.

In one aspect, a process is provided comprising: feeding urea to a gasification chamber, feeding heated gases into the gasification chamber upstream of the point for introducing the urea by injector means capable of distributing the urea as fine particles or droplets, providing a gas distribution plate in the chamber in proximity to the injector means, providing an arrangement and spacing of the holes in the gas distribution plate to provide higher gas velocity in the vicinity of the injector means than near the walls of the chamber, and adjusting the feed rates of the urea and the heated gases effectively to gasify the urea prior to exit from the chamber. Preferably, the urea is employed as an aqueous solution In another aspect, an apparatus is provided comprising: a gasification chamber having top bottom and side walls, injector means for feeding urea to the gasification chamber and capable of distributing the urea within the chamber as fine particles or droplets, duct means for feeding heated gases into the gasification chamber upstream of the injector means, a gas distribution plate in the chamber in proximity to the injector means said plate having an arrangement and spacing of the holes effective to provide higher gas velocity in the vicinity of the injector means than near the side walls of the chamber, and gas exit means for directing the heated gases containing gasified urea from the chamber.

Preferably, the method and apparatus are employed in combination with a catalyst for selective catalytic NO$_x$ reduction.

Systems employing the process and apparatus as disclosed are also provided.

Other and preferred aspects of the invention are described below.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

FIG. 1 is a schematic side elevation of a preferred embodiment of the process and system of the invention.

FIG. 2 is a schematic top plan view of a system as shown in FIG. 1.

DETAILED DESCRIPTION OF THE INVENTION

Figure 3:
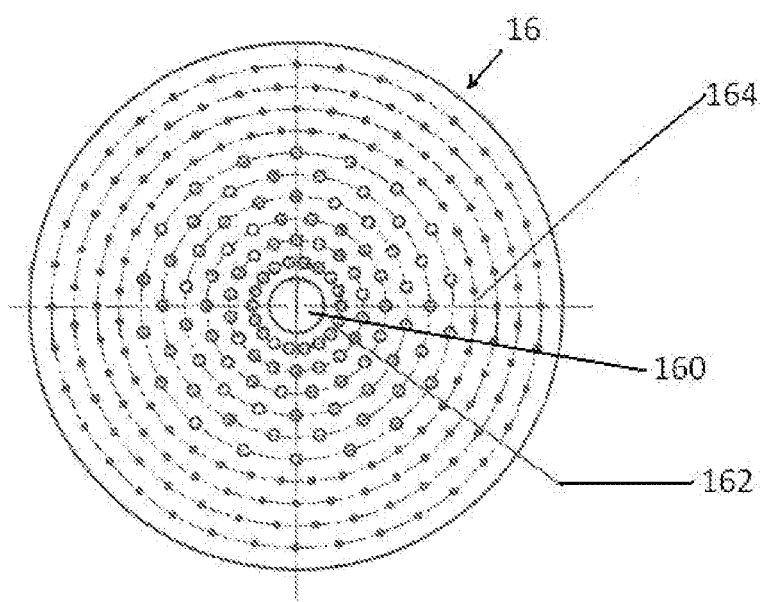
FIG. 3 is a top plan view of a preferred distribution plate design for use in a system as shown in FIG. 1

In describing the present invention, reference is made to the drawings, wherein there is seen a preferred embodiment shown schematically in FIG. 1. The drawings and the process they represent will be described briefly below, without undue recitation of various components described in U.S. Pat. No. 7,090,810, which is incorporated herein in its entirety.

The term "urea" is meant to include the reagents that are equivalent to urea in the sense that they form ammonia and HNCO when heated, whether or not they contain large amounts of the pure chemical urea in the form introduced; however, the reagents that are equivalent to urea typically contain measurable quantities of urea in their commercial forms and thus comprise urea. Among the $NO_x$-reducing reagents that can be gasified are those that comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; triuret, cyanuric acid; isocyanic acid; urea formaldehyde; melamine; tricyanourea and mixtures of any number of these. Yet other $NO_x$-reducing reagents are available that do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine; hexamethylamine carbonate; and byproduct wastes containing urea from a chemical process. Amines with higher alkyls can be employed to the extent that the hydrocarbon components released do not interfere with the $NO_x$-reduction reaction.

The term "urea" is thus meant to encompass urea in all of its commercial and equivalent forms. Typically, commercial forms of urea will consist essentially of urea, containing 95% or more urea by weight. This relatively pure form of urea is preferred and has several advantages in the process of the invention. It is preferably supplied to the process as an aqueous solution at a concentration of from about 5 to about 70%, with about 30 to about 60% being most typical. Urea can be used also as a finely divided solid or as a melt. When certain of these reagents are gasified, the reactant gas will also contain HNCO which can react with water to convert to ammonia and carbon dioxide. It is an advantage of the invention that this can be easily achieved without prehydrolysis of the $NO_x$-reducing reagent which has the attendant risk of plugging nozzles and other equipment. By the term "gasification" we mean that substantially all of the urea is converted into a gas, leaving no significant dissolved or free solids or liquid to contact the SCR catalyst.

With reference to FIG. 1, there is shown a gasification chamber 10, having a gas inlet 12, a gas outlet 14, a gas distribution plate 16 and an injector 18 for introducing aqueous urea solution, fed through line 20, as a spray 19 of fine particles (in the case of solid urea) or droplets (in the case of liquid urea). A preferred arrangement of the gas inlet 12 and the outlet 14 in relation to the chamber 10 can be seen by taking FIG. 1 and FIG. 2 together. The chamber 10 is shown to include a top wall 102, a bottom wall 104 and a side wall 106.

The detail of one embodiment of a distribution plate is shown in FIG. 3. In the figure, there are illustrated a central hole 160, and eight circular arrays of smaller holes, 162 and 164. The central hole 160 is of a size sufficient to permit an injector to introduce urea through it and meet the heated gases in the chamber 10 at a velocity that prevents gas recirculation. The injector is preferably juxtaposed with the plate. The injector opening can be above, below or at the elevation of the plate depending on the nozzle design and flow rates. Preferably, the nozzle will be spaced from the plate to allow flow through the hole 160 and between the injector 18 and the plate 16. One preferred set of dimensions provides a central hole of 2½ inch diameter, six sets of 16 larger holes 162, each set arranged in a circular pattern, and four sets of 36 smaller holes 164 having a diameter of ¼ inch spaced equally in a circular pattern. The smaller holes 164 are staggered from circle to circle at an angle of about 5°. The angle between the staggerd larger holes 162 is 10°. For holes of this exemplary type and dimension, the flow rate for urea solution (for a 35% solution) can be between about 0.1 and about 10 liters per minute and the gas flow rate can be between about 50 and about 1000 cubic feet per minute.

The urea injector 18 introduces finely dispersed particles or droplets. The spray pattern 19 is preferably designed to be conical or otherwise as will provide uniform distribution. Any suitable injector or nozzle can be employed, e.g., air assisted, airless and mechanical atomizers can be utilized. Droplet or particle sizes less than 500 microns but typically less than 100, and preferably below 50, microns are desirable to rapidly evaporate any water and decompose the urea. Also in consideration of vessel size, small and slow droplets generated from, e.g., ultrasonic nozzles, can be more desirable than large and fast droplets. If desired, steam can be utilized as an atomizing fluid. Urea feed line 20 can provide a central channel for the urea and a surrounding annular channel for the atomizing fluid which can protect the urea from decomposition in the line 20 prior to exiting the injector 18.

The heated gases entering chamber 10 via inlet 12 will gasify the urea by pyrolyzation and/or hydrolysis, and the gases containing gasified urea exit from the chamber 10 via outlet 14. The gases are preferably introduced into the chamber 10 at a temperature of at least 400° F., preferably greater than 500° F., and more preferably from about 600° F. to about 1300° F., e.g., from about 700° F. to about 1200° F. The temperature of the gases and the residence time prior to exit from the chamber 10 will be effective to achieve full gasification. The entry temperature should be high enough also to maintain an exit temperature of at least about 350° F. and preferably at least 450° F. The presence of moisture from the entering gases or a urea solution will facilitate hydrolysis, which is desired but not essential. The invention will provide improved urea decomposition chamber design through gas velocity shaping using a perforated plate design with varying sizes of openings effective to prevent back flow of urea or byproducts toward the nozzle and solids encrustation of the nozzle.

As a precaution to the possibility of solids or liquids exiting the chamber harming the SCR unit downstream, an element 15 can be employed. Element 15 can be a screen, series of baffles or vanes, filter or the like, which designed to trap solids or liquids, from whatever source. It can optionally contain a catalyst to hydrolyze HNCO or urea or byproduct to ammonia.

A proper velocity distribution of hot air before and after introduction of urea is critical for the operation of the decomposition chamber 10 and is achieved by the invention. The invention provides urea injection into a desirable hot gas flow pattern to achieve urea distribution for effective gasification without causing nozzle fouling and related problems. Effective gas velocity shaping is achieved by using the specially designed perforated plate 16 and proper positioning of the injector 18 outlet, to create a gas velocity profile that nearly matches the gas with the urea particle or droplet velocity near the injector and provides a reduced gas velocity near the wall 106. The design of the holes in plate 16 and the flow parameters of the urea and hot gases can be achieved by computational fluid dynamics or cold flow modeling, or trial and error with greater difficulty.

It is an advantage that the invention provides gas and liquid velocity shaping, which avoid a flow recirculation zone near the injector 18. The recirculation near the injector, as has occurred in the past, is undesirable because it can cause droplets to deposit on the injector body. Once deposited, the reagent solidifies and accumulates over time. This solid mass tends to grow towards the injector spray and eventually interferes with the spray pattern causing large particles or droplets that can impinge on the chamber walls. Impingement on the walls generates solid deposits on the wall. By nearly matching gas velocity to spray velocity, this recirculation zone and its adverse effects are avoided.

It is another advantage of the invention that velocity shaping reduces the magnitude of gas flow rate through the chamber 10. A uniformly high gas velocity could reduce near-injector recirculation; however, this would require a higher volume of hot gas, increasing heating and gas blower requirements. The invention preferably provides a near zero gas velocity near the wall and high gas velocity at the injector at the center, with a net reduction in the quantity of gas flow required. It is thus an advantage of the invention that effective flow rates can be achieved without increasing the height of the chamber.

It is yet another advantage of the invention that velocity shaping stabilizes the flow pattern within the chamber 10. If gas were fed near the injector only, the recirculation zone near injector would disappear but the downstream flow pattern would become unstable. Instead of a stable high velocity core in the center, it would move closer to a wall, increasing the likelihood of urea impingement.

It is a further advantage of the invention that velocity shaping allows a large cross sectional area for injection. An alternative method to stabilize the flow would be to shape the chamber as an upside-down funnel to force the core to be at the center. However, this would substantially reduce the area for chemical injection and thus increase the likelihood of droplet impingement on a wall. The invention avoids the problem while providing a large cross-sectional area for injection.

Preferably, the method and apparatus are employed in combination with a catalyst for selective catalytic $NO_x$ reduction, for selective noncatalytic $NO_x$ reduction and for other purposes such as flue gas conditioning, and the like.

Systems employing the process and apparatus combine the disclosed features and incorporate details as necessary for a wide variety of industrial applications.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

What is claimed is:

1. A process for gasifying urea for reducing the concentration of nitrogen oxides in combustion gases, comprising:
   a. feeding aqueous urea to a vertical gasification chamber having a top wall, a bottom wall and a side wall,
   b. feeding heated gases into the gasification chamber above the point for introducing the urea by urea injector means for distributing the aqueous urea as fine droplets,
   c. providing a horizontal gas distribution plate in the vertical gasification chamber, wherein the gas distribution plate has a central hole and arrays of smaller holes, and the injector means is juxtaposed with the plate and centrally located with the central opening in the plate and has an injector opening below or at the elevation of the plate to allow gas flow through the central hole and between the injector means and the plate,
   d. providing an arrangement and spacing of the smaller holes in the gas distribution plate to provide higher gas velocity in the vicinity of the injector means than near the walls of the chamber, and
   e. adjusting the feed rates of the aqueous urea and the heated gases effectively to gasify the urea prior to exit from the chamber.

2. A process according to claim 1 wherein the arrangement and spacing of the holes is determined by computational fluid dynamics or cold flow modeling.

3. A process according to claim 1 wherein the urea is introduced as an aqueous solution.

4. A process according to claim 3 wherein the aqueous solution is introduced at a concentration of from about 5 to about 70% urea by weight in aqueous solution.

5. A process according to claim 1 wherein the temperature of the heated gases upstream of the point for introducing the urea is at least about 400° F.

6. A process according to claim 5 wherein the temperature of the heated gases upstream of the point for introducing the urea is from about 600° F. to about 1300° F.

7. A process according to claim 1 which further includes passing the gases containing gasified urea through an element, which is designed to trap solids or liquids.

8. A process according to claim 7 wherein the element contains a catalyst to convert HNCO or urea or byproduct to ammonia.

9. A process according to claim 1 including the step of passing the gases from the gasification chamber through a catalyst effective for selective catalytic reduction of $NO_x$.

* * * * *